(12) United States Patent
Kawasaki (10) Patent No.: US 8,494,751 B2
(45) Date of Patent: Jul. 23, 2013

(54) MOTOR CONTROL APPARATUS FOR INTERNAL COMBUSTION SYSTEM, AND MOTOR CONTROL APPARATUS

(75) Inventor: Takashi Kawasaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 549 days.

(21) Appl. No.: 12/675,571

(22) PCT Filed: Oct. 20, 2008

(86) PCT No.: PCT/JP2008/069385
§ 371 (c)(1),
(2), (4) Date: Feb. 26, 2010

(87) PCT Pub. No.: WO2010/047000
PCT Pub. Date: Apr. 29, 2010

(65) Prior Publication Data
US 2010/0250091 A1    Sep. 30, 2010

(51) Int. Cl.
*G06F 19/00* (2011.01)
*G06G 7/70* (2006.01)
*F02B 75/04* (2006.01)

(52) U.S. Cl.
USPC ........................ 701/102; 123/48 C (58) Field of Classification Search
USPC ........... 123/90.11, 90.16, 90.17, 90.18, 78 R, 123/78 E, 78 F, 339.23, 568.16, 568.23, 568.24, 123/48 C; 701/108, 101, 102; 318/601, 604, 318/400.21, 433, 599
See application file for complete search history.

(56) References Cited

U.S. PATENT DOCUMENTS

| | | | | |
|---|---|---|---|---|
| 4,749,922 A | * | 6/1988 | Hoppe et al. | 318/257 |
| 5,485,067 A | * | 1/1996 | Nishimoto et al. | 318/466 |
| 6,194,792 B1 | * | 2/2001 | Yanou et al. | 307/10.1 |

FOREIGN PATENT DOCUMENTS

| | | |
|---|---|---|
| JP | A-9-219992 | 8/1997 |
| JP | A-2001-78480 | 3/2001 |
| JP | A-2001-214770 | 8/2001 |
| JP | A-2002-037095 | 2/2002 |
| JP | A-2004-339984 | 12/2004 |
| JP | A-2008-50956 | 3/2008 |

OTHER PUBLICATIONS

International Search Report issued on Jan. 27, 2009 in International Application No. PCT/JP2008/069385 (with translation).
Written Opinion of the International Search Authority issued on Jan. 27, 2009 in International Application No. PCT/JP2008/069385 (with partial translation).

* cited by examiner

*Primary Examiner* — Stephen K Cronin
*Assistant Examiner* — Sherman Manley
(74) *Attorney, Agent, or Firm* — Oliff & Berridge, PLC (57) ABSTRACT

A control signal output unit (62) outputs a rotational direction signal indicating a rotational direction of a motor (53) and a pulse width modulation control signal. A motor-driving unit (63) drives the motor (53) based on the pulse width modulation control signal and rotational direction signal inputted therein. A connection unit (64) electrically connects the control signal output unit (62) and the motor-driving unit (63) to transmit the pulse width modulation control signal and rotational direction signal outputted from the control signal output unit (62) to the motor-driving unit (63). The motor-driving unit (63) comprises a trouble-detecting unit (631). The trouble-detecting unit (631) successfully detects an occurrence of a trouble in the connection unit (64) by comparing the duty ratio in the inputted pulse width modulation control signal with the rotational direction in the inputted rotational direction signal.

8 Claims, 6 Drawing Sheets

MOTOR CONTROL APPARATUS FOR INTERNAL COMBUSTION SYSTEM, AND MOTOR CONTROL APPARATUS

TECHNICAL FIELD

The present invention relates to a motor control apparatus for controlling a motor by means of pulse width modulation (hereinafter, "pulse width modulation" is simply called as "PWM"). Particularly, the present invention relates to a motor control apparatus for an internal combustion system, for controlling a motor placed in a system including an internal combustion by means of PWM.

BACKGROUND ART

In a system including an internal combustion engine (e.g., a vehicle), a motor for making an individual constructional member thereof operate may be placed therein.

For example, Japanese Patent Application Laid-Open (kokai) No. 2001-78480 discloses an electrically-driven power steering apparatus. In this electrically-driven power steering apparatus, a direct-current motor for assisting to steer front wheels is comprised.

In addition, Japanese Patent Application Laid-Open (kokai) No. 2004-339984 discloses a compression ratio-changing mechanism capable of changing a compression ratio by moving a cylinder block in a direction of an axis of a cylinder relatively to a lowercase (crankcase). In this compression ratio-changing mechanism, a servo motor is used as a source of power for moving said cylinder block.

Further, Japanese Patent Application Laid-Open (kokai) No. 2008-50956 discloses a valve timing-adjusting apparatus for adjusting a valve timing by rotationally driving an electrically-driven motor. This valve timing-adjusting apparatus comprises an electrically-driven motor such as a brushless motor or the like.

As disclosed in Japanese Patent Application Laid-Open (kokai) No. 2001-78480 or Japanese Patent Application Laid-Open (kokai) No. 2008-50956, this type of motor is electrically connected with a driver circuit. In addition, this driver circuit is electrically connected with a control circuit. Then, said control circuit provides said driver circuit with a control signal, and thereby the movement of said motor is controlled.

DISCLOSURE OF THE INVENTION

As disclosed in Japanese Patent Application Laid-Open (kokai) No. 2001-78480, as said control signal, a PWM control signal is widely used. Namely, in the configuration disclosed in Japanese Patent Application Laid-Open (kokai) No. 2001-78480, the movement of said motor (including its rotational direction) is controlled in accordance with said PWM control signal.

By the way, in a signal line, through which said control signal is transmitted from said control circuit to said driver circuit, or at a connection unit including a connector at a connection point between such a signal line and each circuit, a trouble such as disconnection or detachment of said connector may occur. When such a trouble occurs, in this type of conventional configuration, the duty ratio in said control signal may be falsely detected as to be 0 or 100%, and thereby a problem such as waste of electric power by wasting driving current in said motor or the like may occur.

The present invention has been conceived to solve such a problem. Namely, an object of the present invention is to successfully judge a connection trouble such as disconnection or detachment of connector in such a type of apparatus.

<Configuration>

A motor control apparatus according to the present invention is so configured as to control a motor by means of PWM. In the case where the present invention is applied to a system including an internal combustion engine, the motor control apparatus for an internal combustion system according to the present invention is so configured as to control said motor placed in said system by means of PWM.

The motor control apparatus, or the motor control apparatus for an internal combustion system, according to the present invention comprises a control signal output unit, a motor-driving unit, and a connection unit.

Said control signal output unit is so configured as to output a rotational direction signal indicating a rotational direction of said motor, as well as a PWM control signal.

Said motor-driving unit is so configured as to be inputted said PWM control signal and said rotational direction signal. In addition, the motor-driving unit is so configured as to drive said motor based on said inputted PWM control signal. Meanwhile, the motor-driving unit may be so configured as to drive said motor based on said inputted PWM control signal and said inputted rotational direction signal.

Said control signal output unit and said motor-driving unit are electrically connected through said connection unit. The connection unit is so configured as to transmit said PWM control signal and said rotational direction signal outputted from said control signal output unit to said motor-driving unit.

In one aspect of the present invention, said motor-driving unit comprises a trouble-detecting unit. Herein, the trouble-detecting unit is so configured as to detect an occurrence of a trouble in said connection unit by comparing the duty ratio in said inputted PWM control signal with said rotational direction in said inputted rotational direction signal.

One of said PWM control signal and said rotational direction signal may be pulled up and the other may be pulled down.

Said connection unit may comprise a PWM control signal line to transmit said PWM control signal, a rotational direction signal line to transmit said rotational direction signal, an input connector to be attached to an input terminal of said motor-driving unit to electrically connecting the input terminal with said PWM control signal line and said rotational direction signal line. In this case, said motor-driving unit may comprise a pull-up resistor placed between said input terminal and said trouble-detecting unit such that one of said PWM control signal and said rotational direction signal is pulled up, and a pull-down resistor placed between said input terminal and said trouble-detecting unit such that the other of said PWM control signal and said rotational direction signal is pulled down.

Said motor-driving unit may comprise an energization shut-off unit. The energization shut-off unit is so configured as to shut off the energization of said motor when said trouble-detecting unit detects an occurrence of a trouble in said connection unit.

<Function and Effect>

Said trouble-detecting unit successfully detects an occurrence of a trouble in said connection unit by comparing the duty ratio in said PWM control signal and said rotational direction in said rotational direction signal inputted in said motor-driving unit. Accordingly, in accordance with the present invention, when a connection trouble occurs in said connection unit, an occurrence of such a trouble can be successfully judged.

Thus, one of said PWM control signal and said rotational direction signal is pulled up and the other is pulled down, and, thereby, an occurrence of a trouble in said connection unit can be more successfully detected.

When an occurrence of a trouble in said connection unit is detected by said trouble-detecting unit as described above, said energization shut-off unit can immediately shut off the energization of said motor. Thus, useless consumption of electric power due to waste of driving current can be effectively suppressed.

BEST MODE FOR CARRYING OUT THE INVENTION

An embodiment (an embodiment that the applicant of the present patent application believes to be the best) of the present invention will next be described with reference to the drawings.

The following description of the embodiments is nothing more than the specific description of mere example embodiments of the present invention to the possible extent in order to fulfill description requirements (descriptive requirement and enabling requirement) of specifications required by law. Accordingly, as will be described later, naturally, the present invention is not limited to the specific configurations of embodiments to be described below. Modifications that can be made to the embodiments are collectively described herein at the end, since insertion thereof into the description of the embodiments would disturb consistent understanding of description of the embodiments.

<Configuration of Internal Combustion Engine>

Figure 1:
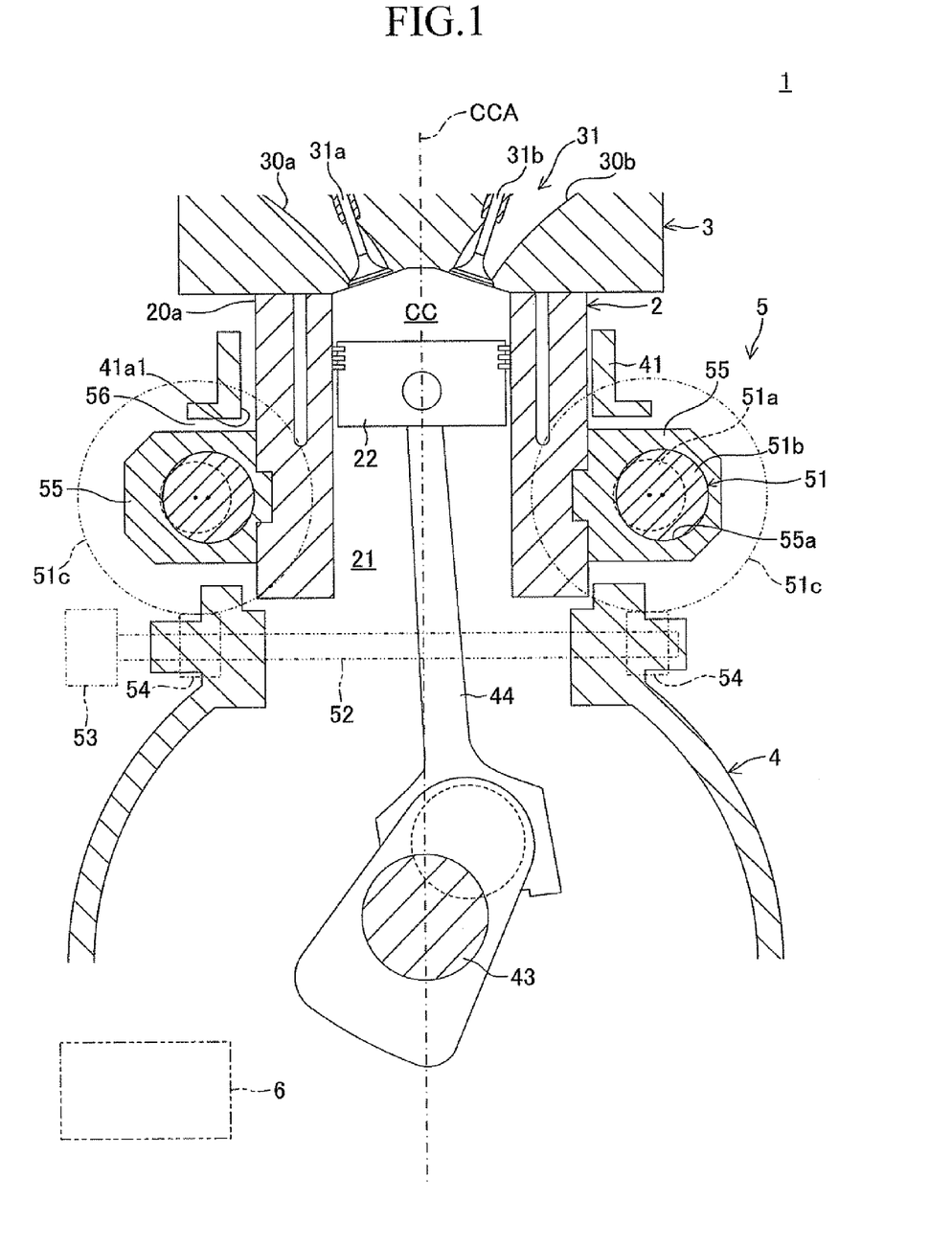
FIG. 1 is a side sectional view, showing a schematic configuration of an engine according to an embodiment of the present invention.
Figure 2:
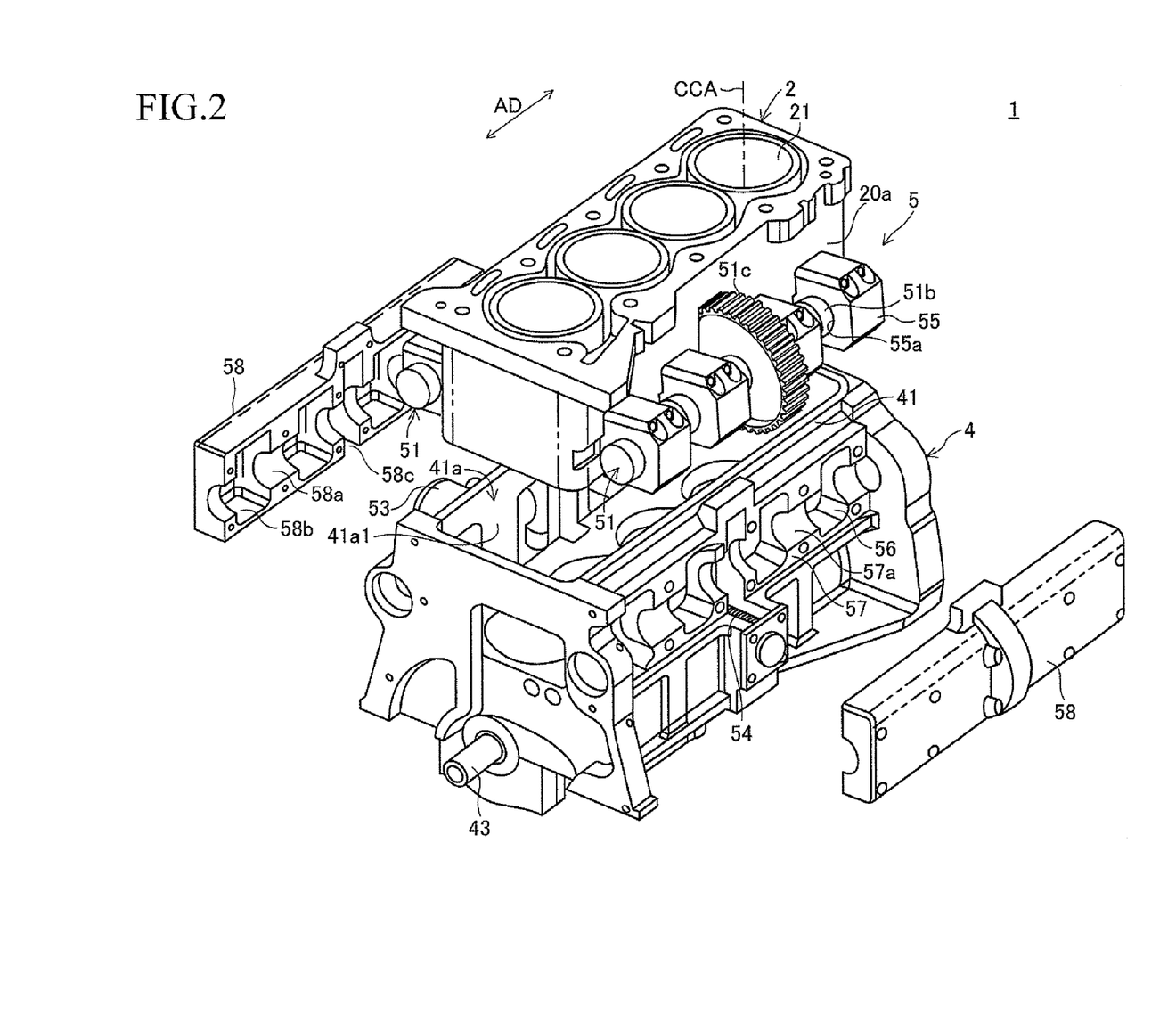
FIG. 2 is an exploded perspective view of the engine shown in FIG. 1.

FIG. 1 is a side sectional view, showing a schematic configuration of an Engine 1 according to an embodiment of the present invention. FIG. 2 is an exploded perspective view of the Engine 1 shown in FIG. 1.

Referring to FIG. 1 and FIG. 2, the Engine 1 according to the present embodiment comprises a Cylinder Block 2, a Cylinder Head 3, a Crankcase 4, a Movement Mechanism 5, and a Control Apparatus 6.

The Engine 1 is configured such that a compression ratio can be changed by moving (sliding) the Cylinder Block 2 and the Cylinder Head 3 relatively to the Crankcase 4 along the height direction of the engine (the direction parallel to a Cylinder Center Axis CCA). The Control Apparatus 6 is so configured as to control the movement of each of the members constituting the Engine 1.

<<Cylinder Block>>

The Cylinder Block 2 is a member in a shape of approximate rectangular solid, approximate rectangle in planar view, and is made of aluminum base alloy and formed integrally. An External Side Surface 20a of the Cylinder Block 2 is formed as a surface as smooth as the internal surface of a Cylinder 21.

The Cylinder 21 is a through-hole in a shape of approximate cylindrical column. In the present embodiment, plural Cylinders 21 are placed in line along a Cylinder Alignment Direction AD.

The Cylinder Block 2 is so formed as to have a longitudinal direction parallel to the Cylinder Alignment Direction AD (refer to FIG. 2). Inside the Cylinder 21, a Piston 22 is housed such that the Piston 22 can reciprocate along the Cylinder Center Axis CCA orthogonal to the Cylinder Alignment Direction AD.

<<Cylinder Head>>

On the top surface of the Cylinder Block 2, the Cylinder Head 3 is joined. The Cylinder Head 3 is made of aluminum base alloy and formed integrally. The Cylinder Head 3 is fixed to the Cylinder Block 2 in such a manner that the Cylinder Head 3 covers the end of the Cylinder 21 on the top dead center side of the Piston 22 (the upper end in the figure). Namely, the Cylinder Head 3 is fixed on the top of the Cylinder Block 2 by means of a bolt (not shown) or the like such that the Cylinder Head 3 does not move relatively to the Cylinder Block 21 (the Cylinder Head 3 moves up and down together with the Cylinder Block 21).

On the Cylinder Head 3, plural concave portions are formed. Each concave portion is placed at a position corresponding to each Cylinder 21. This concave portion and a space over the top surface of the Piston 22 inside the Cylinder 21 form a Combustion Chamber CC. In addition, in the Cylinder Head 3, an Intake Port 30a and an Exhaust Port 30b are so formed as to communicate with the Combustion Chamber CC.

Further, the Cylinder Head 3 comprises a Valve Train 31. The Valve Train 31 comprises an Intake Valve 31a and an Exhaust Valve 31b. The Intake Valve 31a is configured such that the Intake Valve 31a can open and close the Intake Port 30a according to the rotation angle of an intake cam shaft (not shown).

<<Crankcase>>

The Crankcase 4 is made of aluminum base alloy and formed integrally. The Crankcase 4 according to the present embodiment is so configured as to be able to house the Cylinder Block 2 inside. Specifically, in the upper portion of the Crankcase 4, a Frame 41 is placed. The Frame 41 is a tubular member having its axis direction along the height direction of the engine, and is so formed as to its longitudinal direction parallel to the Cylinder Alignment Direction AD. Inside the Frame 41, a Cylinder Block-Housing Portion 41a is formed. The Cylinder Block-Housing Portion 41a is a space that is approximately rectangle in planar view and is so formed as to be able to house the Cylinder Block 2. The Cylinder Block-Housing Portion 41a is placed along the height direction of the engine.

An Internal Surface 41a1 of the Cylinder Block-Housing Portion 41a (hereinafter, may be referred to an "Internal Surface 41a1 of the Frame 41") is so placed as to face an External Surface 20a of the Cylinder Block 2. The Internal Surface 41a1 is also formed as a smooth surface similarly to the External Surface 20a of the Cylinder Block 2. Between the External Surface 20a of the Cylinder Block 2 and the Internal Surface 41a1 of the Frame 41, a clearance of about a few millimeters is formed such that the Cylinder Block 2 can reciprocate along the height direction of the engine, within the Cylinder Block-Housing Portion 41a, by virtue of the motion of the Movement Mechanism 5.

At the bottom of the Crankcase 4, a Crankshaft 43 is supported in a rotatable manner. The Crankshaft 43 is placed parallel to the Cylinder Alignment Direction AD. The Crankshaft 43 is coupled with the Piston 2 through a Connecting Rod 44 such that the Crankshaft 43 is rotationally driven based on the reciprocal motion of the Piston 22 along the Cylinder Center Axis CCA.

<<Movement Mechanism>>

On both side walls of the Frame 41 along the Cylinder Alignment Direction AD and in the vicinity thereof, the Movement Mechanism 5 is placed. The Movement Mechanism 5 comprises a pair of Control Shafts 51. A pair of the Control Shafts 51 is placed parallel to each other, on both sides of the Cylinder Block 2. The Movement Mechanism 5, which is a compression ratio-changing mechanism, has the following configuration such that the Movement Mechanism 5 can move the Cylinder Block 2 relatively to the crankcase along the height direction of the engine.

<<<Control Shaft>>>

Figure 3:
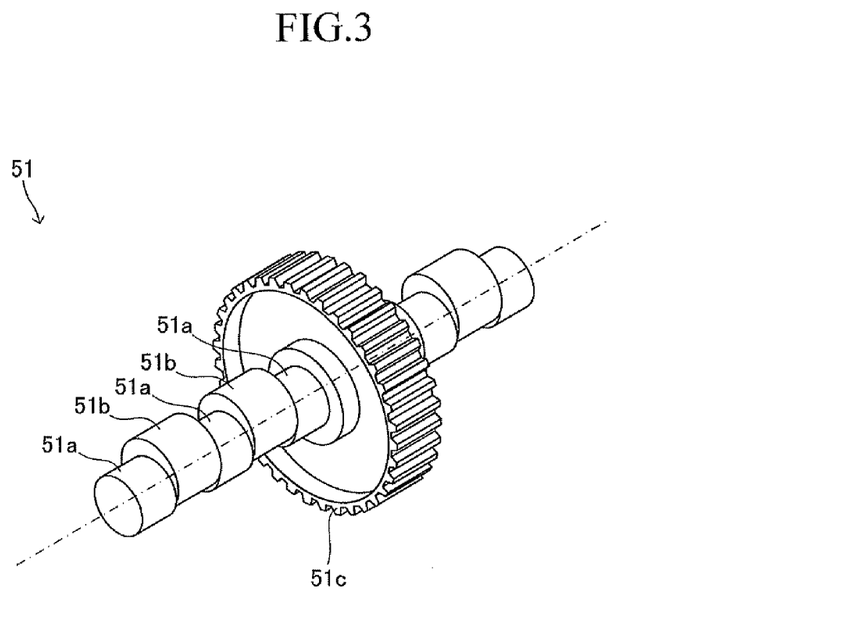
FIG. 3 is a perspective view of the control shaft shown in FIG. 1 and FIG. 2.

FIG. 3 is a perspective view of the control shaft shown in FIG. 1 and FIG. 2. Referring to FIG. 1, FIG. 2, and FIG. 3, the Control Shaft 51 consists of a Journal Portion 51a, a Circular Cam Portion 51b, and a Worm Wheel 51c. The Journal Portion 51a, the Circular Cam Portion 51b, and the Worm Wheel 51c are arranged in line along the longitudinal direction (the direction shown by the alternate long and short dash line in FIG. 3) of the Control Shaft 51.

The Control Shaft 51 is configured such that the Journal Portion 51a, the Circular Cam Portion 51b, and the Worm Wheel 51c rotate integrally. Namely, the Journal Portion 51a, the Circular Cam Portion 51b, and the Worm Wheel 51c are integrally bound with each other.

The Journal Portion 51a is a member in a shape of cylindrical column, and is placed coaxially with the rotation center axis of the Control Shaft 51. The Journal Portions 51a are placed between the adjacent Circular Cam Portions 51b and at both ends in the longitudinal direction of the Control Shaft 51. The rotation center axis is so configured as to be parallel to the Cylinder Alignment Direction AD and orthogonal to the Cylinder Center Axis CCA (refer to the alternate long and short dash line in FIG. 3).

The Circular Cam Portion 51b is so placed as to project through the Journal Portion 51a at a position corresponding to the Cylinder 21. Specifically, the Circular Cam Portion 51b is a member in a shape of cylindrical column with a diameter larger than that of the Journal Portion 51a, and is placed eccentrically to the rotation center axis of the Control Shaft 51. In the present embodiment, as shown in FIG. 1, in a medium compression ratio state (in a state where the compression ratio is set to the median between the highest compression ratio and the lowest compression ratio within the variable range), a pair of the Control Shafts 51 is configured and placed such that the projection direction of the Circular Cam Portion 51b is parallel to the width direction of the engine.

At the approximate center of the longitudinal direction of the Control Shaft 51, the Worm Wheel 51c is placed. The Worm Wheel 51c is a disc-like gear, and is placed coaxially with the rotation center axis of the Control Shaft 51.

<<<Control Shaft-Driving Portion>>>

Referring to FIG. 1 and FIG. 2, the Movement Mechanism 5 also comprises a Drive Shaft 52, a Compression Ratio Control Motor 53, and a pair of Worms 54.

The Drive Shaft 52 is placed parallel to the width direction of the engine such that the Drive Shaft 52 is orthogonal to each of a pair of the Control Shafts 51. One end (the left end in the figures) of the Drive Shaft 52 is coupled with the Compression Ratio Control Motor 53. Namely, the Drive Shaft 52 is so configured and placed as to be rotationally driven by the Compression Ratio Control Motor 53.

The Compression Ratio Control Motor 53 is a servo motor comprising an encoder, and is electrically connected with the Control Apparatus 6. The configuration of such a Control Apparatus 6, which is an embodiment of the present invention, for controlling a Compression Ratio Control Motor 53 will be described later in detail.

At both ends of the Drive Shaft 52, a pair of Worms 54 is placed. The Worm 54 is a cylindrical gear having a spiral tooth profile engaging with the Worm Wheel 51c, is fixed on the Drive Shaft 52 such that the Worm 54 rotates integrally with the Drive Shaft 52. One of a pair of the Worms 54 is placed at a position corresponding to one of a pair of the Worm Wheels 51c.

<<<Block-Side Supporting Portion>>>

On the Cylinder Block 2, a Block-side Supporting Portion 55 is attached. The Block-side Supporting Portion 55 is placed at a position corresponding to the Circular Cam Portion 51b. Namely, plural Block-side Supporting Portions 55 are so placed as to correspond to the Cylinders 21.

In the Block-side Supporting Portion 55, a Bearing Hole 55a is formed. The Bearing Hole 55a is a through-hole having an internal diameter (which the surface of the Circular Cam 51b can slide thereon) corresponding to the external diameter of the Circular Cam 51b. Namely, the Circular Cam 51b is supported by and housed in the Block-side Supporting Portion 55 in a rotatable manner.

<<<Crankcase-Side Supporting Portion>>>

The Frame 41 has the same number of Openings 56 as that of the Block-side Supporting Portions 55. The Opening 56 is a hole penetrating said side wall along the Cylinder Alignment Direction AD of the Frame 41, and is so formed to be able to house the Block-side Supporting Portions 55 that moves together with the Cylinder Block 2.

On the Frame 41, plural Frame-side Supporting Portions 57 are formed. Namely, plural Frame-side Supporting Portions 57 are placed on both side of each Opening 56, and arranged along the Cylinder Alignment Direction AD. These Frame-side Supporting Portions 57 are placed on the outside of the Frame 41 (on the side opposite the Internal Surface 41a1). The Frame-side Supporting Portions 57 has a Journal-supporting Concave Portion 57a. The Journal-supporting Concave Portion 57a is a concave portion having a shape corresponding to half cylindrical column, and is so formed as to have an internal diameter corresponding to the external diameter of the Journal Portion 51a.

On the Frame 41, a Cover Portion 58 is attached. The Cover Portion 58 is so placed as to face the Frame-side Supporting Portion 57 to contain the Journal Portion 51a of the Control Shaft 51 between them. The Cover Portion 58 is so configured as to be attached to the Frame-side Supporting Portion 57 and thereby support the Control Shaft 51 (the Journal Portion 51a) together with the Frame-side Supporting Portion 57 in a rotatable manner (in FIG. 1, for clear representation, a graphic representation of the Cover Portion 58 is omitted).

The Cover Portion 58 is integrally (seamlessly) formed such that the Cover Portion 58 corresponds to the plural Frame-side Supporting Portions 57 arranged along the Cylinder Alignment Direction AD. On the Cover Portion 58, Journal-supporting Concave Portions 58a, Bearing-housing Portions 58b, and a Worm Wheel-housing Portion 58c are formed.

The Journal-supporting Concave Portion 58a is a concave portion in a shape of half cylindrical column, which is a shape symmetric to the Journal-supporting Concave Portion 57a in the Frame-side Supporting Portion 57, and is so placed as to face the Journal-supporting Concave Portion 57a. Namely, by means of a bearing hole formed by the Journal-supporting Concave Portion 58a and the Journal-supporting Concave Portion 57a, the Journal Portion 51a is supported and housed in a rotatable manner. Thus, in the configuration according to the present embodiment, the Journal Portion 51a is supported in a rotatable manner by the Frame 41 and the Cover Portion 58, and, thereby, the Cylinder Block 2 is Supported by the Crankcase 4 (Frame 41) through the Control Shaft 51.

The Bearing-housing Portion 58b is a concave portion placed at a position facing the Block-side Supporting Portion 55. The Bearing-housing Portion 58b is so formed as to be able to house the Block-side Supporting Portion 55 that moves while projecting outside the Frame 41 through the Opening 56. The Worm Wheel-housing Portion 58c is concave portion placed at a position facing the Worm Wheel 51c. The Worm Wheel-housing Portion 58c is so formed as to be able to house the Worm Wheel 51c projecting outside the Frame 41.

<<Control Apparatus>>

Figure 4:
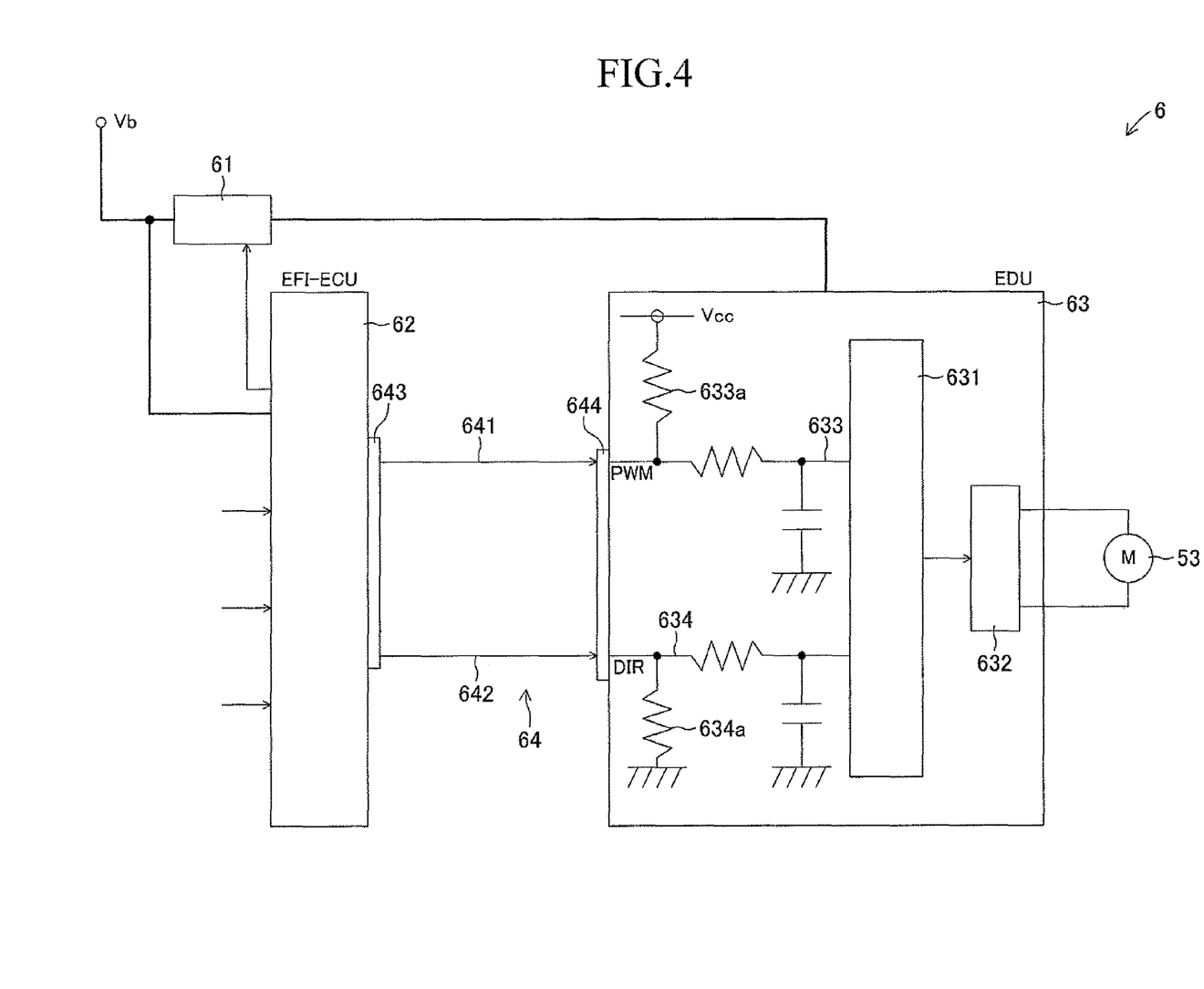
FIG. 4 is a schematic view, showing the circuit configuration of the control apparatus shown in FIG. 1.

FIG. 4 is a view, showing the schematic circuit configuration of the Control Apparatus 6 shown in FIG. 1. The Control Apparatus 6, which is an embodiment of motor control apparatuses and motor control apparatuses for internal combustion system according to the present invention, is configured as follows, such that the Control Apparatus 6 controls the Compression Ratio Control Motor 53 by means of PWM.

The Control Apparatus 6 comprises a Relay Switch Circuit 61, an ECU (Electrical Control Unit) 62, an EDU (Electrical Driver Unit) 63, and a Connection Unit 64. The Relay Switch Circuit 61 and the ECU 62 are electrically connected with an Electric Power Supply Vb such that a power supply voltage is directly fed from the Electric Power Supply Vb. The ECU 62 is electrically connected with the Electric Power Supply Vb through the Relay Switch Circuit 61. Namely, the Relay Switch Circuit 61 is so configured as to switch on and off the power supply voltage from the Electric Power Supply Vb to the EDU 63 when operating under the control of the ECU 62.

The ECU 62 is electrically connected with a sensor or the like (not shown) for obtaining an operational status (number of revolutions, load, or the like) of the Engine 1, and is so configured as to obtain an operational status based on an input from these sensor or the like. In addition, the ECU 62 is so configured as to output a signal for making an individual constructional member of the Engine 1 in a desired mode based on the obtained operational status.

Specifically, for example, the ECU 62 is so configured as to determine a compression ratio of the Engine 1 based on the obtained operational status. Then, the ECU 62, as a control signal output unit according to the present invention, is so configured to output a rotational direction signal corresponding to a rotational direction of the Compression Ratio Control Motor 53 and a PWM control signal toward the EDU 63 based on the determined compression ratio (these signals will be described later in detail in a section for describing the operation).

The EDU 63, as a motor-driving unit according to the present invention, is so configured as to have the rotational direction signal inputted in an input terminal for rotational direction signal (in the figure, "DIR"), as well as to have a PWM control signal inputted in an input terminal for PWM control signal (in the figure, "PWM"). Then, the EDU 63 is so configured as to drive the Compression Ratio Control Motor 53 based on the inputted PWM control signal.

Specifically, the EDU 63 comprises a Drive Control Circuit 631 and a Driver Circuit 632. The Drive Control Circuit 631 is a logic IC built in the EDU 63, and is so configured as to drive the Compression Ratio Control Motor 53, at a desired direction and a desired amount (angle) of rotation, through the Driver Circuit 632, which is an H-bridge circuit, based on the received PWM control signal.

In addition, the Drive Control Circuit 631, as a trouble-detecting unit according to the present invention, is so configured as to detect an occurrence of a trouble (the contents thereof will be described later) at the Connection Unit 64 by comparing the duty ratio in the received PWM control signal with the rotational direction in the received rotational direction signal. Further, the Drive Control Circuit 631, as an energization shut-off unit according to the present invention, is so configured as to shut off the energization of the Compression Ratio Control Motor 53 upon the detection of an occurrence of the above-described trouble.

The input terminal for a PWM control signal of the EDU 63 and the Drive Control Circuit 631 are connected through a PWM Communication Line 633. The PWM Communication Line 633 is pulled up through a Pull-up Resistor 633a. On the other hand, the input terminal for a rotational direction signal of the EDU 63 and the Drive Control Circuit 631 are connected through a Rotational direction Communication Line 634. The Rotational direction Communication Line 634 is pulled down through a Pull-down Resistor 634a.

The ECU 62 and the EDU 63 are electrically connected through the Connection Unit 64. Specifically, the Connection Unit 64 comprises a PWM Control Signal Line 641, a Rotational direction Signal Line 642, an Output Connector 643, and an Input Connector 644. The Connection Unit 64 is so configured as to transmit a PWM control signal outputted from the ECU 62 to the EDU 63 through the PWM Control Signal Line 641. In addition, the Connection Unit 64 is so configured as to transmit a rotational direction signal outputted from the ECU 62 to the EDU 63 through the Rotational direction Signal Line 642.

At one end of the PWM Control Signal Line 641 and the Rotational direction Signal Line 642, the Output Connector 643 is connected, and at the other end, the Input Connector 644 is connected. The Output Connector 643 is so configured as to be removably attached to an output terminal of the ECU 62 for electrically connecting the output terminal with the PWM Control Signal Line 641 and the Rotational direction Signal Line 642. The Input Connector 644 is so configured as to be removably attached to an input terminal (including the above-described input terminal for a PWM control signal and input terminal for a rotational direction signal) of the EDU 63 for electrically connecting the input terminal with the PWM Control Signal Line 641 and the Rotational direction Signal Line 642.

<Description of Operation of Configuration in Present Embodiment>

Referring to FIG. 1 to FIG. 4, as well as other figures, as necessary, operation of the configuration according to the present embodiment will be described below.

<<Summary of Operation for Changing Compression Ratio>>

In a medium compression ratio state, as shown in FIG. 1, the projecting direction of the Circular Cam 51b is parallel to the width direction of the engine. Herein, in the present embodiment, the duty ratio of the PWM control signal in a medium compression ratio state is provided to be 50%. In addition, it is provided that the duty ratio of the PWM control signal is set at a value more than 50% when changing the compression ratio of the Engine 1 from a medium compression ratio state to a high compression ratio side, while the duty ratio of the PWM control signal is set at a value less than 50% when changing the compression ratio of the Engine 1 from a medium compression ratio state to a low compression ratio side.

The ECU 62 determines the compression ratio of the Engine 1 in accordance with the obtained operational status. Then, the ECU 62 generates a PWM control signal with a desired duty ratio for controlling the amount (angle) of rotation of the Compression Ratio Control Motor 53 to a predetermined amount based on the determined compression ratio.

In addition, the ECU 62 compares the duty ratio of the PWM control signal determined as the above with 50%, and, based on the result, generates a rotational direction signal. Specifically, the ECU 62 generates such a signal that the signal becomes "HI", i.e. 5 V, when the duty ratio is 50% or more, while the signal becomes "LO", i.e. 0 V, when the duty ratio is less than 50%.

The ECU 62 outputs a PWM control signal and a rotational direction signal as described above. There signals are transmitted to the EDU63 through the Connection Unit 64.

When a compression ratio is changed from the medium compression ratio state shown in FIG. 1 to a high compression ratio side, a PWM control signal with a duty ratio of more than 50% is outputted from the ECU 62 toward the EDU63. The Drive Control Circuit 631 in the EDU 63 rotates the Compression Ratio Control Motor 53 to the first direction by a predetermined amount, through the Driver Circuit 632, based on the duty ratio in the received PWM control signal (the operation of the Compression Ratio Control Motor 53 in this case will be called "normal rotation" hereinafter).

On the other hand, when a compression ratio is changed from the medium compression ratio state shown in FIG. 1 to a low compression ratio side, a PWM control signal with a duty ratio of less than 50% is outputted from the ECU 62 toward the EDU63. The Drive Control Circuit 631 in the EDU 63 rotates the Compression Ratio Control Motor 53 to the second direction, which is opposite the above-described first direction, by a predetermined amount, through the Driver Circuit 632, based on the duty ratio in the received PWM control signal (the operation of the Compression Ratio Control Motor 53 in this case will be called "reverse rotation" hereinafter).

Meanwhile, when the Engine 1 is maintained in a medium compression ratio state, a PWM control signal with a duty ratio of 50% is outputted from the ECU 62 toward the EDU 63. The Drive Control Circuit 631 in the EDU 63 restores the amount of rotation of the Compression Ratio Control Motor 53 to the origin (0 degree), through the Driver Circuit 632, based on the received PWM control signal.

As the Compression Ratio Control Motor 53 is rotationally driven as described above, subsequently the Worm 54 rotates. Then, a pair of the Worm Wheels 51c synchronously rotates. By virtue of the rotation of a pair of the Worm Wheels 51c, a pair of the Control Shafts 51 synchronously rotates.

By virtue of the rotation of a pair of the Control Shafts 51, the Journal Portion 51a rotates around the rotation center axis of the Control Shaft 51, inside the bearing hole on the side of the Crankcase 4 (this hole is formed by the Journal Supporting Concave Portion 57a of the Frame-side Supporting Portion 57 and the Journal Supporting Concave Portion 58a of the Cover Portion 58). At this time, the Journal Portion 51a does not move relatively to the Crankcase 4 in the width direction and the height direction of the engine.

On the other hand, by virtue of the rotation of the Control Shaft 51, the Circular Cam 51b moves on an orbit in a shape of a circular arc in side view around the rotation center axis of the Control Shaft 51. In addition, the Circular Cam 51b rotates inside the Block-side Supporting Portion 55, while sliding on the internal surface of the Bearing Hole 55a in the Block-side Supporting Portion 55.

Then, the Cylinder Block 2 moves along the Cylinder Center Axis CCA. Thereby, the distance between the Cylinder Head 3 and the Crank Shaft 43 varies, and the compression ratio is changed.

<<Trouble Detection Operation>>

During the operation of the Engine 1, a trouble such as a detachment of the Output Connector 643 from the output terminal of the ECU 62, a detachment of the input Connector 644 from the input terminal of the EDU 63, and the like may occur (such a detachment of a connector shuts off the electrical connection with the EDU 63 on both of the PWM Control Signal Line 641 and the Rotational direction Signal Line 642).

Alternatively, during the operation of the Engine 1, a trouble such as a disconnection of the PWM Control Signal Line 641 or the Rotational direction Signal Line 642, an electrical short circuit thereof with other portion, and the like may occur (such a disconnection or electrical short circuit may occur on one or both of the PWM Control Signal Line 641 and the Rotational direction Signal Line 642).

Figure 5:
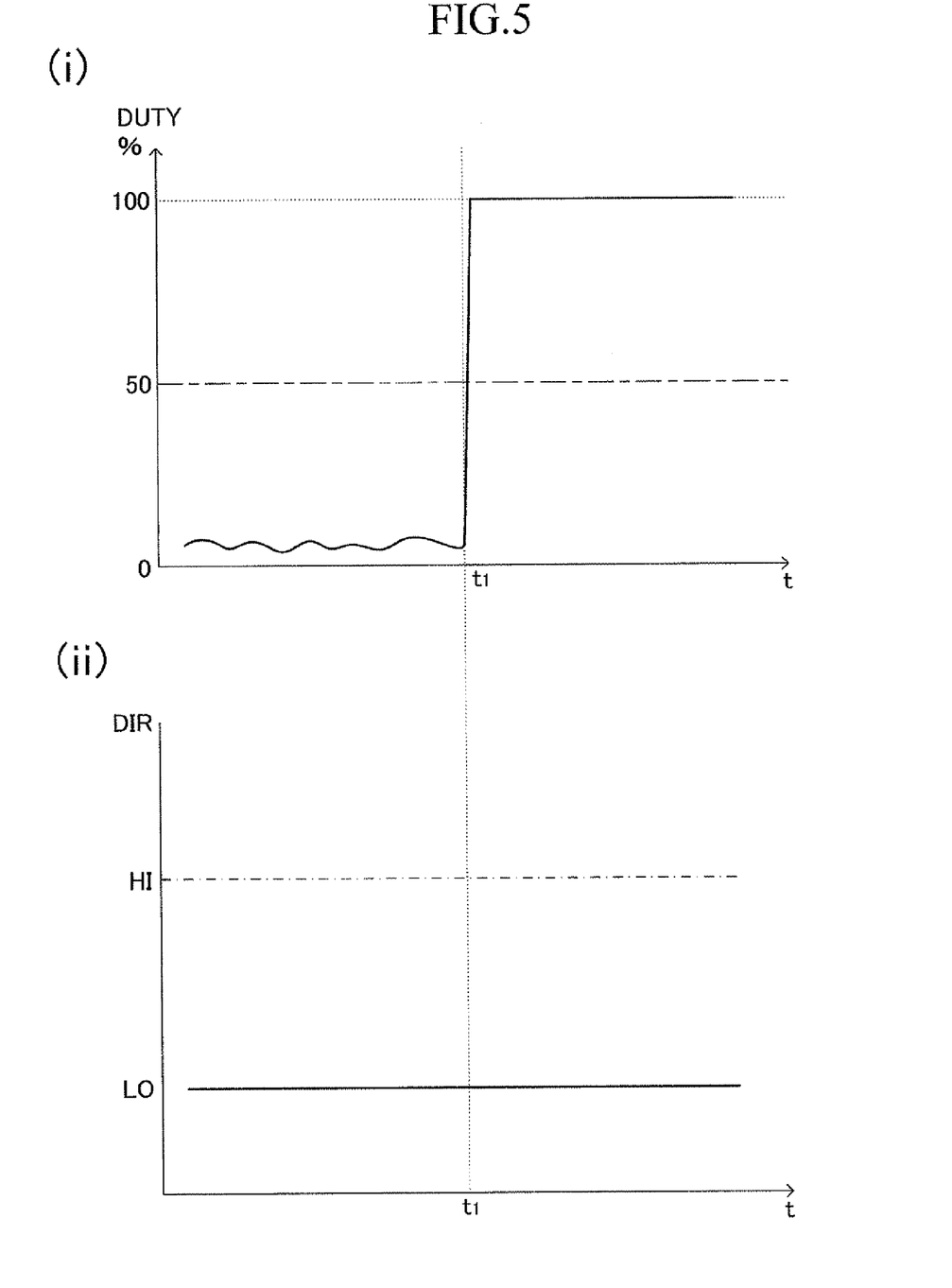
FIG. 5 is a graph, showing a typical pattern of a signal received by the drive control circuit shown in FIG. 4.

FIG. 5 is a graph, showing a typical pattern of a signal received by the Drive Control Circuit 631 shown in FIG. 4. Herein, it is provided that the (i) in the figure shows the duty ratio in the PWM control signal received by the Drive Control Circuit 631, through the PWM Communication Line 633, and the (ii) shows the rotational direction signal received by the Drive Control Circuit 631, through the Rotational direction Communication Line 634.

For example, it is assumed that a trouble of the detachment of connector, as described above, occurs at a time t1 in the process of controlling the compression ratio of the Engine 1 to a low compression ratio side. In this case, since the PWM control signal is pulled up, the duty ratio in the PWM control signal hits the ceiling and remains at 100%, as shown in (i) of FIG. 5. On the other hand, since the rotational direction signal is pulled down, the rotational direction signal hits the bottom and remains at "LO", as shown in (ii) of FIG. 5.

Now, comparing the duty ratio in the PWM control signal with the rotational direction in the rotational direction signal after t1, they are inconsistent (the rotational direction should be "HI" when the duty ratio is 100%). Therefore, the Drive Control Circuit 631 detects the occurrence of the trouble in the Connection Unit 64, based on such a comparison. Then, the Drive Control Circuit 631 shuts off the energization of the Compression Ratio Control Motor 53 upon detecting an occurrence of such a trouble.

Figure 6:
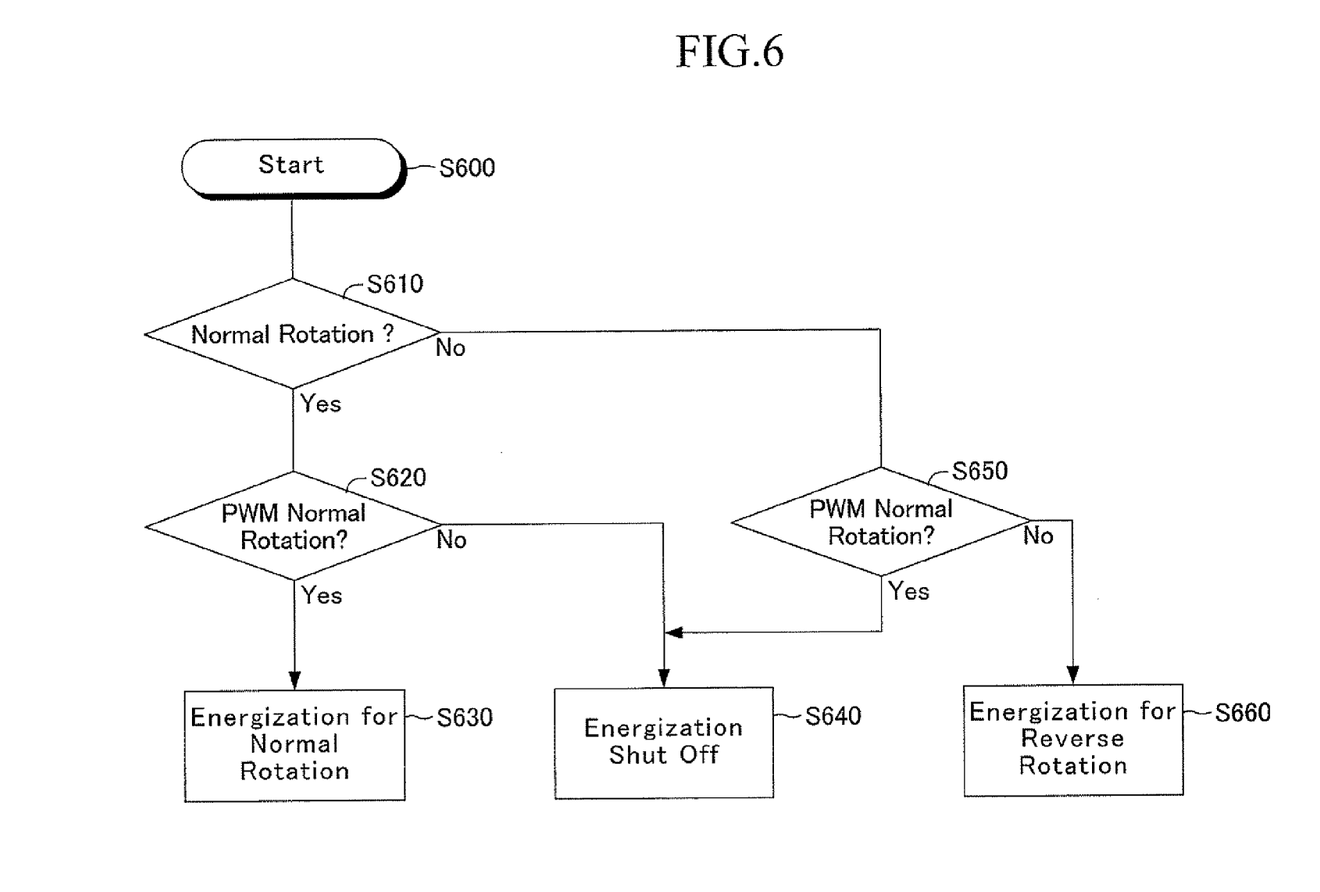
FIG. 6 is a flow chart, showing a trouble detection performed by the drive control circuit shown in FIG. 4.

FIG. 6 is a flow chart, showing a trouble detection performed by the Drive Control Circuit 631 shown in FIG. 4. Referring to FIG. 6, a specific example of the trouble detection operation will be described below. "S" in the figure stands for "Step".

After the operation start (Step 600), the Drive Control Circuit 631 first judges whether the received rotational direction signal is a normal rotation signal, i.e. "HI", or not (Step 610).

In the case where the received rotational direction signal is a normal rotation signal (Step 610=Yes), the Drive Control Circuit 631 then judges whether the PWM control signal is a signal on the normal rotation side, i.e. whether the duty ratio in the PWM control signal is 50% or more, or not (Step 620).

In the case where the received rotational direction signal is a normal rotation signal (Step 610=Yes) and the PWM control signal is a signal on the normal rotation side (Step 620=Yes), it is judged as to be good and the Compression Ratio Control Motor 53 is energized, in accordance with the PWM control signal (Step 630).

On the contrary, in the case where the received rotational direction signal is a normal rotation signal (Step 610=Yes) while the PWM control signal is a signal on the reverse rotation side (Step 620=No), it is judged as to be in trouble and the energization of the Compression Ratio Control Motor 53 is shut off (Step 640).

Also in the case where the received rotational direction signal is a reverse rotation signal (Step 610=No), the Drive Control Circuit 631 then judges whether the PWM control signal is a signal on the normal rotation side or not (Step 650).

In the case where the received rotational direction signal is a reverse rotation signal (Step 610=No) and the PWM control signal is a signal on the reverse rotation side (Step 650=No), it is judged as to be good and the Compression Ratio Control Motor 53 is energized, in accordance with the PWM control signal (Step 660).

On the contrary, in the case where the received rotational direction signal is a reverse rotation signal (Step 610=No) while the PWM control signal is a signal on the normal rotation side (Step 650=Yes), it is judged as to be in trouble and the energization of the Compression Ratio Control Motor 53 is shut off (Step 640).

<Function and Effect by Configuration in Present Embodiment>

As described above in detail, in the present embodiment, the Drive Control Circuit 631 compares the duty ratio in the PWM control signal inputted into the EDU 63 with the rotational direction in the rotational direction signal. In other words, the Drive Control Circuit 631 compares the signs ("HI" or "LO") in the inputted duty ratio and rotational direction. Then, the Drive Control Circuit 631 successfully detects an occurrence of a trouble in the Connection Unit 64 by such a comparison.

Accordingly, the configuration according to the present embodiment can successfully judge an occurrence of the connection trouble as described above, when such a trouble occurs in the Connection Unit 64.

In addition, in the present embodiment, one of the PWM control signal and the rotational direction signal is pulled up and the other is pulled down. Thereby, the above-described trouble detection can be more successfully performed.

Further, in the present embodiment, when an occurrence of a trouble in the Connection Unit 64 is detected, the energization of the Compression Ratio Control Motor 53 can be immediately shut off. Thereby, useless consumption of electric power due to waste of driving current can be effectively suppressed.

<Exemplification of Modifications>

The above-described embodiment is, as described above, mere exemplification of an example of specific configuration of the present invention which the applicant of the present invention contemplated as to be the best mode at the time of filing the present application, and the above-described embodiment should not be construed as limiting the invention. Accordingly, various modifications to the above-described embodiment shall be possible, so long as the invention is not modified in essence.

Several modifications will be exemplified below. However, needless to say, even modifications are not limited to those described below. It is impermissible to construing the present invention in a limited way based on the above-described embodiment and the following modifications, since it impairs the interests of an applicant (particularly, an applicant who is motivated to file as quickly as possible under the first-to-file system) while unfairly benefiting imitators, and is thus impermissible.

It also goes without saying that the configuration of the above-described embodiment and the configurations of the modifications to be described below are entirely or partially applicable in appropriate combination, so long as no technical inconsistencies are involved.

(1) The present invention is not limited to the application to the compression ratio changing mechanism as described in the above embodiment. For example, the present invention can be suitably applied to an electrically-driven power steering apparatus and a valve timing-adjusting apparatus as well. In addition, compression ratio changing mechanisms, to which the present invention can be applied, include a configuration for controlling the bend status of a bendable connecting rod (refer to Japanese Patent Application Laid-Open (kokai) No. 2001-214770) besides the configuration as described in the above embodiment.

(2) Although, in the above-described embodiment, the Drive Control Circuit 631 is a logic IC which is so built as to be able to perform the operation shown in FIG. 6, configurations of the Drive Control Circuit 631 are not limited to this at all. For example, the Drive Control Circuit 631 may be a digital circuit other than a logic IC, such as a gate array, and may be a CPU capable of performing a routine (program) corresponding to the flow chart shown in FIG. 6.

(3) Contrary to the above-described embodiment, the PWM Communication Line 633 may be pulled down, while the Rotational direction Communication Line 634 may be pulled up.

(4) The Output Connector 643 may be omitted. Namely, the ECU 62 may be directly connected with the PWM Control Signal Line 641 and the Rotational direction Signal Line 642 by means of soldering or the like.

(5) Naturally, other modifications not particularly referred to herein are to be included in the technical scope of the present invention, so long as the invention is not modified in essence.

For example, the present invention is applicable to any types of internal combustion including a gasoline engine, a diesel engine, a methanol engine, a bio-ethanol engine, and the like. Number of cylinders and cylinder alignment (in-line engine, V-type engine, horizontal opposed engine) are not particularly limited, either.

Material or shape may be properly changed. Further, an integrally formed member (one piece) may be changed to a separately formed member (two pieces), and the contrary is also possible. An integrally formed member (one piece) may be formed without joint lines (seamlessly), and may be so formed as to comprise a joining layer by means of welding or adhering.

Further, the operatively or functionally represented components among the components constituting the means for solving the problems according to the present invention includes any configurations capable of realizing the operation or function, in addition to the specific configurations disclosed in the above-described embodiments or modifications.

The invention claimed is:

1. A motor control apparatus for an internal combustion system including an internal combustion engine, the motor control apparatus configured to control a motor placed in the internal combustion system by means of pulse width modulation, comprising:

a control signal output unit configured to output a rotational direction signal corresponding to a rotational direction of said motor and a pulse width modulation control signal;

a motor-driving unit, into which said rotational direction signal and said pulse width modulation control signal are inputted, the motor driving unit configured to drive said motor based on said inputted pulse width modulation control signal; and a connection unit configured to electrically connect said control signal output unit and said motor-driving unit to transmit said pulse width modulation control signal and said rotational direction signal outputted from said control signal output unit to said motor-driving unit, wherein said motor-driving unit comprises a trouble-detecting unit for detecting an occurrence of a trouble in said connection unit by comparing the duty ratio in said inputted pulse width modulation control signal with said rotational direction in said inputted rotational direction signal, and the motor is configured to vary a compression ratio of the internal combustion engine.

2. A motor control apparatus for an internal combustion system according to claim 1,
wherein one of said pulse width modulation control signal and said rotational direction signal is pulled up and the other is pulled down.

3. A motor control apparatus for an internal combustion system according to claim 2, wherein
said connection unit comprises:
a pulse width modulation control signal line to transmit said pulse width modulation control signal;
a rotational direction signal line to transmit said rotational direction signal;
an input connector to be attached to an input terminal of said motor-driving unit to electrically connect the input terminal with said pulse width modulation control signal line and said rotational direction signal line, and
said motor-driving unit comprises:
a pull-up resistor placed between said input terminal and said trouble-detecting unit such that one of said pulse width modulation control signal and said rotational direction signal is pulled up; and
a pull-down resistor placed between said input terminal and said trouble-detecting unit such that the other of said pulse width modulation control signal and said rotational direction signal is pulled down.

4. A motor control apparatus for an internal combustion system according to claim 1, wherein said motor-driving unit further comprises an energization shut-off unit to shut off the energization of said motor when said trouble-detecting unit detects an occurrence of a trouble in said connection unit.

5. A motor control apparatus configured to control a motor by means of pulse width modulation, comprising:
a control signal output unit configured to output a rotational direction signal corresponding to a rotational direction of said motor and a pulse width modulation control signal;

a motor-driving unit, into which said rotational direction signal and said pulse width modulation control signal are inputted, the motor driving unit configured to drive said motor based on said inputted pulse width modulation control signal; and a connection unit configured to electrically connect said control signal output unit and said motor-driving unit to transmit said pulse width modulation control signal and said rotational direction signal outputted from said control signal output unit to said motor-driving unit, wherein said motor-driving unit comprises a trouble-detecting unit for detecting an occurrence of a trouble in said connection unit by comparing the duty ratio in said inputted pulse width modulation control signal with said rotational direction in said inputted rotational direction signal, and the motor is configured to vary a compression ratio of the internal combustion engine.

6. A motor control apparatus according to claim 5, wherein one of said pulse width modulation control signal and said rotational direction signal is pulled up and the other is pulled down.

7. A motor control apparatus according to claim 6, wherein said connection unit comprises:
a pulse width modulation control signal line to transmit said pulse width modulation control signal;
a rotational direction signal line to transmit said rotational direction signal;
an input connector to be attached to an input terminal of said motor-driving unit to electrically connect the input terminal with said pulse width modulation control signal line and said rotational direction signal line, and
said motor-driving unit comprises:
a pull-up resistor placed between said input terminal and said trouble-detecting unit such that one of said pulse width modulation control signal and said rotational direction signal is pulled up; and
a pull-down resistor placed between said input terminal and said trouble-detecting unit such that the other of said pulse width modulation control signal and said rotational direction signal is pulled down.

8. A motor control apparatus according to claim 5, wherein said motor-driving unit further comprises an energization shut-off unit to shut off the energization of said motor when said trouble-detecting unit detects an occurrence of a trouble in said connection unit.

* * * * *